(12) United States Patent
Hu et al.

(10) Patent No.: US 11,366,278 B2
(45) Date of Patent: Jun. 21, 2022

(54) OPTICAL MEMBER DRIVING MECHANISM

(71) Applicant: TDK TAIWAN CORP., Taoyuan (TW)

(72) Inventors: Chao-Chang Hu, Taoyuan (TW);
Mao-Kuo Hsu, Taoyuan (TW);
Kai-Jing Fu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 159 days.

(21) Appl. No.: 16/728,683

(22) Filed: Dec. 27, 2019

(65) Prior Publication Data

US 2020/0209612 A1 Jul. 2, 2020

Related U.S. Application Data

(60) Provisional application No. 62/785,593, filed on Dec. 27, 2018.

(30) Foreign Application Priority Data

Dec. 20, 2019 (EP) ..................... 19218906

(51) Int. Cl.
| | |
|---|---|
| *G02B 26/08* | (2006.01) |
| *G02B 7/02* | (2021.01) |
| *G02B 3/14* | (2006.01) |
| *G02B 7/08* | (2021.01) |
| *H04N 5/225* | (2006.01) |
| *H04N 5/232* | (2006.01) |
| *G02B 6/35* | (2006.01) |
| *G02B 7/182* | (2021.01) |
| *G02B 7/09* | (2021.01) |
| *G02B 27/64* | (2006.01) |
| *G02B 23/08* | (2006.01) |

(52) U.S. Cl.
CPC ............. *G02B 7/02* (2013.01); *G02B 3/14* (2013.01); *G02B 6/3514* (2013.01); *G02B 7/08* (2013.01); *G02B 7/09* (2013.01); *G02B 7/182* (2013.01); *G02B 26/0816* (2013.01); *G02B 27/646* (2013.01); *H04N 5/2254* (2013.01); *H04N 5/2257* (2013.01); *H04N 5/2259* (2013.01); *H04N 5/23287* (2013.01); *G02B 23/08* (2013.01); *G03B 2205/0069* (2013.01)

(58) Field of Classification Search
CPC ........ G02B 23/08; G02B 7/08; G02B 6/3514; G02B 7/182; G02B 26/0816; G02B 7/09; G02B 27/646; G02B 3/14; G02B 13/0065; H04N 5/2254; H04N 5/2257; H04N 5/23287; H04N 5/2259; G03B 2205/0069
See application file for complete search history.

(56) References Cited

U.S. PATENT DOCUMENTS 6,781,944 B1 * 8/2004 Tanaka ................. G11B 7/1387
369/112.12

* cited by examiner

*Primary Examiner* — Euncha P Cherry
(74) *Attorney, Agent, or Firm* — Muncy, Geissler, Olds & Lowe, P.C.

(57) ABSTRACT

An optical member driving mechanism is provided, including a movable portion, a fixed portion, a driving assembly, a light emitter, and a light receiver. The driving assembly is configured to drive the movable portion to move relative to the fixed portion. The light emitter emits light toward an object, and the light receiver receives the light reflected by the object.

19 Claims, 11 Drawing Sheets

OPTICAL MEMBER DRIVING MECHANISM

CROSS REFERENCE TO RELATED APPLICATIONS

The present application claims priority to U.S. Provisional Patent Applications No. 62/785,593, filed in Dec. 27, 2018, and Europe Patent Applications No. 19218906.6, filed on Dec. 20, 2019, which are incorporated by reference herein in their entirety.

BACKGROUND OF THE INVENTION

Field of the Invention

The application relates in general to an optical member driving mechanism, and in particular, to an optical member driving mechanism configured to drive an optical member to rotate.

Description of the Related Art 3D modeling is the process of calculating and developing a profile of the surface of an object, and is used in a wide variety of fields. For example, 3D modeling can be used in facial recognition, films, video games, 3D models, and virtual reality. However, devices used for scanning and modeling a real object are usually complex and expensive. Therefore, how to address the aforementioned problem has become an important issue.

BRIEF SUMMARY OF INVENTION

To address the deficiencies of conventional products, an embodiment of the invention provides an optical member driving mechanism, including a movable portion, a fixed portion, a driving assembly, a light emitter, and a light receiver. The driving assembly is configured to drive the movable portion to move relative to the fixed portion. The light emitter emits light toward an object, and the light receiver receives the light reflected by the object.

In some embodiments, the movable portion includes a carrier. The light emitter or the light receiver is disposed on the carrier. The carrier has a metal substrate, an insulation layer, and a wire layer. The insulation layer is disposed between the metal substrate and the wire layer, and the wire layer is electrically connected to the light emitter or the light receiver.

In some embodiments, the metal substrate is a flexible sheet spring, and the light emitter or the light receiver is suspended on the fixed portion via the metal substrate. The metal substrate includes a first engaged section, a second engaged section, and a string section. The first engaged section is affixed to the fixed portion. The insulation layer is disposed on the second engaged section. The string section is connected to the first engaged section and the second engaged section.

In some embodiments, the light emitter and the light receiver are disposed on the movable portion. The driving assembly can drive the movable portion to rotate around a first rotation axis relative to the fixed portion, and the first rotation axis passes through the light emitter and the light receiver. The driving assembly can drive the movable portion to rotate around a second rotation axis relative to the fixed portion, and the second rotation axis is disposed between the light emitter and the light receiver. The distance between the light emitter and the second rotation axis is substantially the same as the distance between the light receiver and the second rotation axis.

In some embodiments, the optical member driving mechanism includes two light receivers, and the movable portion is disposed between the light receivers. The light emitter is disposed on the movable portion.

In some embodiments, the optical member driving mechanism further includes a reflecting member disposed on the movable portion, and the light from the light emitter is reflected by the reflecting member and is emitted toward the object in a particular direction. The light emitter overlaps one of the light receivers as seen from that direction.

In some embodiments, the optical member driving mechanism includes two light emitters, the movable portion is disposed between the light emitters, and the light receiver is disposed on the movable portion.

In some embodiments, the optical member driving mechanism further includes a reflecting member disposed on the movable portion, the light from the light emitter is reflected by the reflecting member and is emitted toward the object. The light emitter, the reflecting member, and the light receiver are arranged in a straight line in sequence.

In some embodiments, the light receiver is an image sensor.

In some embodiments, the light emitter is disposed on the movable portion, and the light from the light emitter moves to the object in a particular direction, wherein the driving assembly can drive the movable portion to rotate around a first rotation axis and a second rotation axis relative to the fixed portion, the first rotation axis is perpendicular to the direction and the second rotation axis, and the second rotation axis is perpendicular or parallel to the direction.

In some embodiments, the optical member driving mechanism further includes a reflecting member disposed on the movable portion, and the light from the light emitter is reflected by the reflecting member and moves in a particular direction, wherein the driving assembly can drive the movable portion to rotate around a first rotation axis and a second rotation axis relative to the fixed portion, the first rotation axis is perpendicular to the direction and the second rotation axis, and the second rotation axis is perpendicular or parallel to the direction.

In some embodiments, the optical member driving mechanism further includes a light path adjusting member disposed on the movable portion, and the light emitter is disposed on the light path adjusting member.

In some embodiments, the optical member driving mechanism further includes a light path adjusting member and a reflecting member, the light path adjusting member is disposed on the movable portion, and the reflecting member is disposed on the light path adjusting member.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical member driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
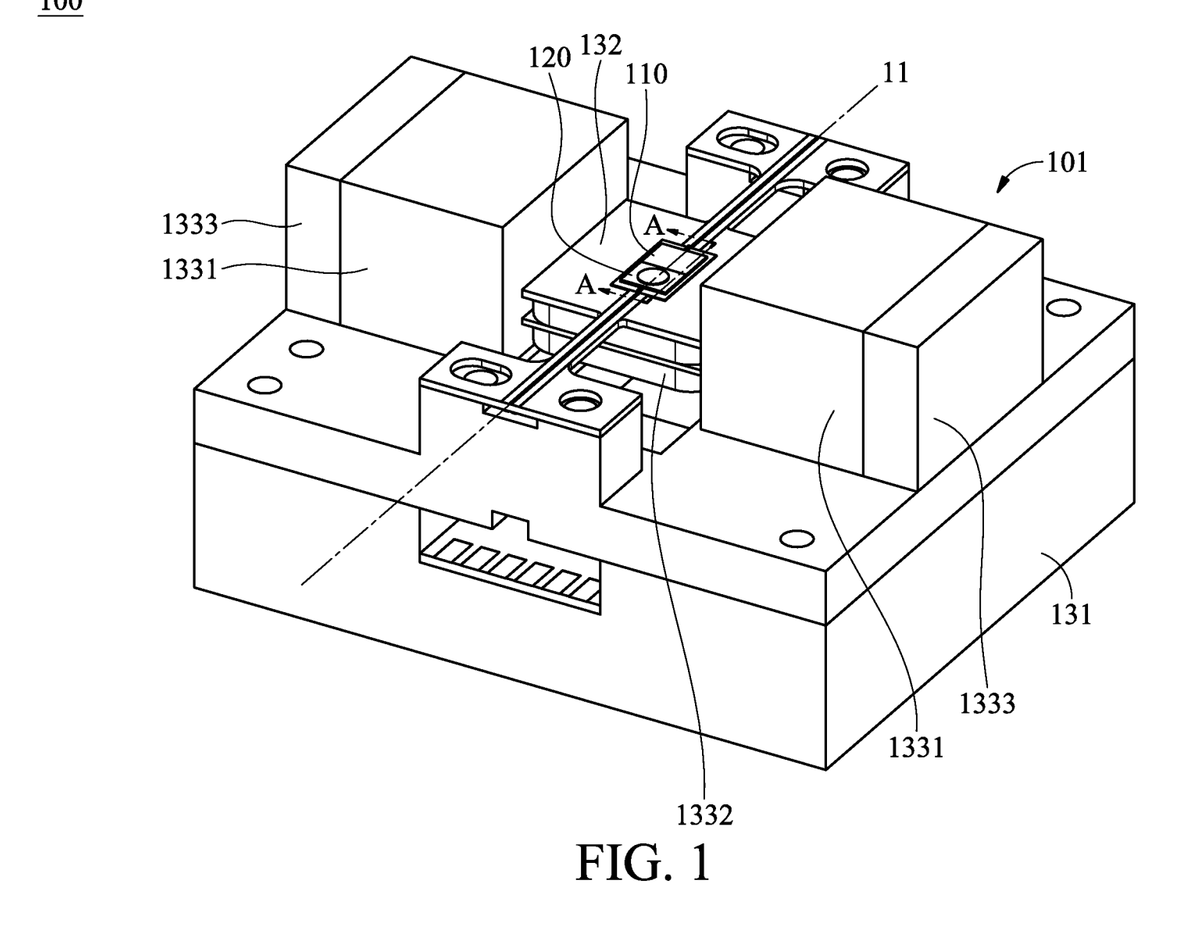
FIG. 1 is a schematic diagram of an optical member driving mechanism according to an embodiment of the invention.
Figure 2:
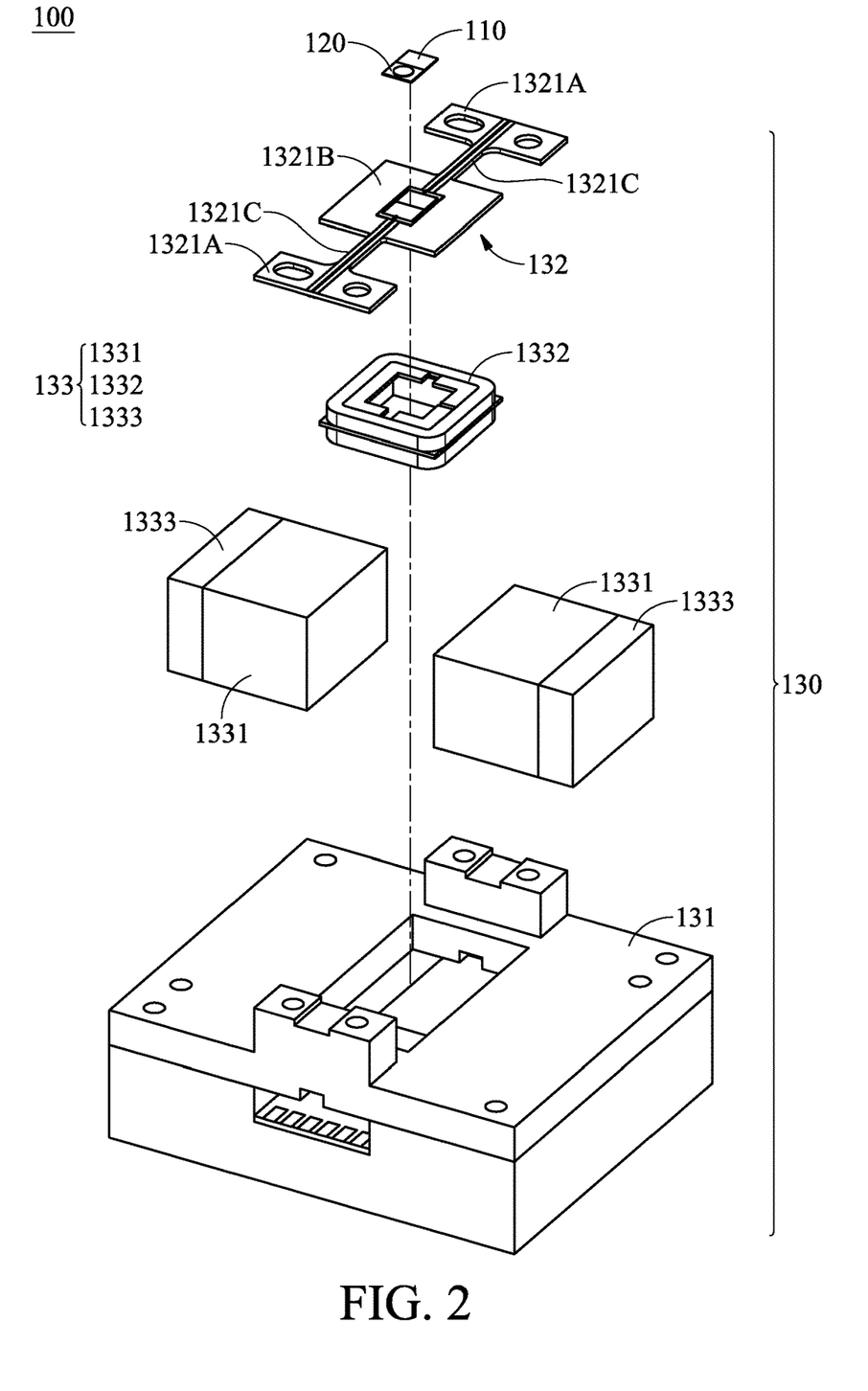
FIG. 2 is an exploded-view diagram of the optical member driving mechanism according to an embodiment of the invention.

FIG. 1 is a schematic diagram of an optical member driving mechanism 100, and FIG. 2 is an exploded-view diagram of the optical member driving mechanism 100. The optical member driving mechanism 100 can be mounted in a vehicle (such as a car or a motorcycle) or a portable device (such as a smart phone or a tablet computer), and can be electrically connected to a processor (not shown). The optical member driving mechanism 100 can emit light toward an object, and receive the light reflected by the object. The processor can calculate the profile of the object according to the time lag between emitting and receiving, or the data of luminous intensity of the received light.

As shown in FIGS. 1 and 2, the optical member driving mechanism 100 primarily includes a light emitter 110, a light receiver 120, and a rotation module 130, wherein the light emitter 110 and the light receiver 120 are disposed on the rotation module 130. The light emitter 110 emits light toward a direction away from the optical member driving mechanism 100 at a side 101 of the optical member driving mechanism 100, and the light receiver 120 receives the same type light being emitted toward the optical member driving mechanism 100 at the same side 101. For example, the light can be an infrared light, a white light, or a laser.

The rotation module 130 includes a fixed portion 131, a movable portion 132, and a driving assembly 133. The fixed portion 131 can be a base, and the movable portion 132 can be a carrier. The movable portion 132 is movably connected to the fixed portion 131.

Figure 3:
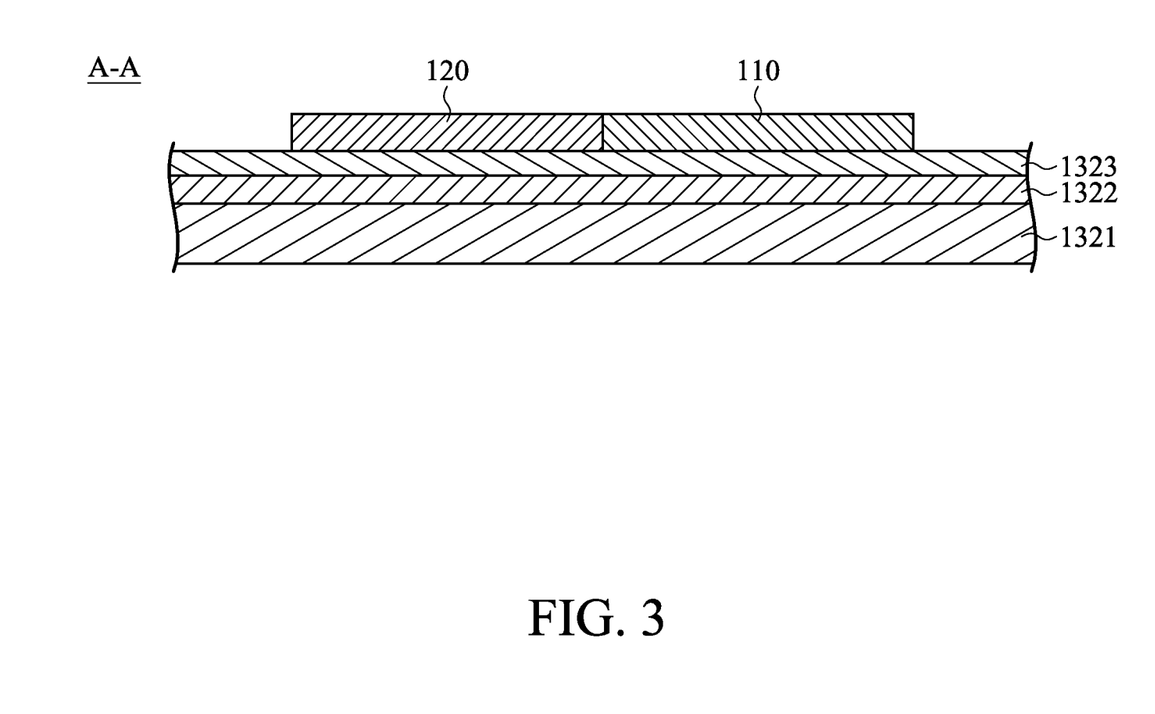
FIG. 3 is a cross-sectional view along the line A-A in FIG. 1.

As shown in FIGS. 2 and 3, in this embodiment, the movable portion 132 has a metal substrate 1321, an insulation layer 1322, and a wire layer 1323. The insulation layer 1322 is disposed between the metal substrate and the wire layer 1323. The light emitter 110 and the light receiver 120 are disposed on the insulation layer 1322 and electrically connected to the wire layer 1323.

In this embodiment, the metal substrate 1321 is constituted by a flexible sheet spring, including at least one first engaged section 1321A, at least one second engaged section 1321B, and at least one string section 1321C. The first engaged section 1321A is affixed to the fixed portion 131, the insulation layer 1322 is disposed on the second engaged section 1321B, and the string section 1321C connects the first engaged section 1321A to the second engaged section 1321B. Therefore, the light emitter 110 and the light receiver 120 can be suspended on the fixed portion 131 by the metal substrate 1321 of the movable portion 132.

The driving assembly 133 includes at least one first electromagnetic driving member 1331, at least one second electromagnetic driving member 1332, and at least one magnetic permeability member 1333. The first electromagnetic driving member 1331 is disposed on the fixed portion 131. The second electromagnetic driving member 1332 is disposed on the movable portion and corresponds to the first electromagnetic driving member 1331. The second engaged section 1321B can be driven to move relative to the fixed portion 131 by the first electromagnetic driving member 1331 and the second electromagnetic driving member 1332.

In detail, in this embodiment, the first electromagnetic member 1331 is a magnet, and the second electromagnetic member 1332 is a coil. When a current flows through the second electromagnetic member 1332, an electromagnetic effect is generated between the first electromagnetic driving member 1331 and the second electromagnetic member 1332, and the second engaged section 1321B is driven to rotate around a first rotation axis 11 relative to the fixed portion 131.

The magnetic permeability member 1333 is adjacent to the first electromagnetic member 1331 to enhance the magnetic pushing force. In some embodiments, the first electromagnetic member 1331 is a coil, and the second electromagnetic member 1332 is a magnet.

Since the light emitter 110 and the light receiver 120 are disposed on the second engaged section 1321B, when the second engaged section 1321B is driven to rotate, the light emitter 110 and the light receiver 120 rotate simultaneously. Therefore, the scanning range of the optical member driving mechanism 100 can be increased, and the situation that the reflected light cannot be received by the light receiver 120 due to the position can be reduced.

In this embodiment, the insulation layer 1322 and the second electromagnetic driving member 1332 are respectively disposed on opposite sides of the metal substrate 1321. Furthermore, the light emitter 110 and the light receiver 120 are arranged along the first rotation axis 11, so that the first rotation axis 11 passes through the light emitter 110 and the light receiver 120. In some embodiments, the light emitter 110 and the light receiver 120 are respectively disposed on the different sides of the first rotation axis 11, and the distance between the light emitter 110 and the first rotation axis 11 is substantially the same as the distance between the light receiver 120 and the first rotation axis 11.

Figure 4:
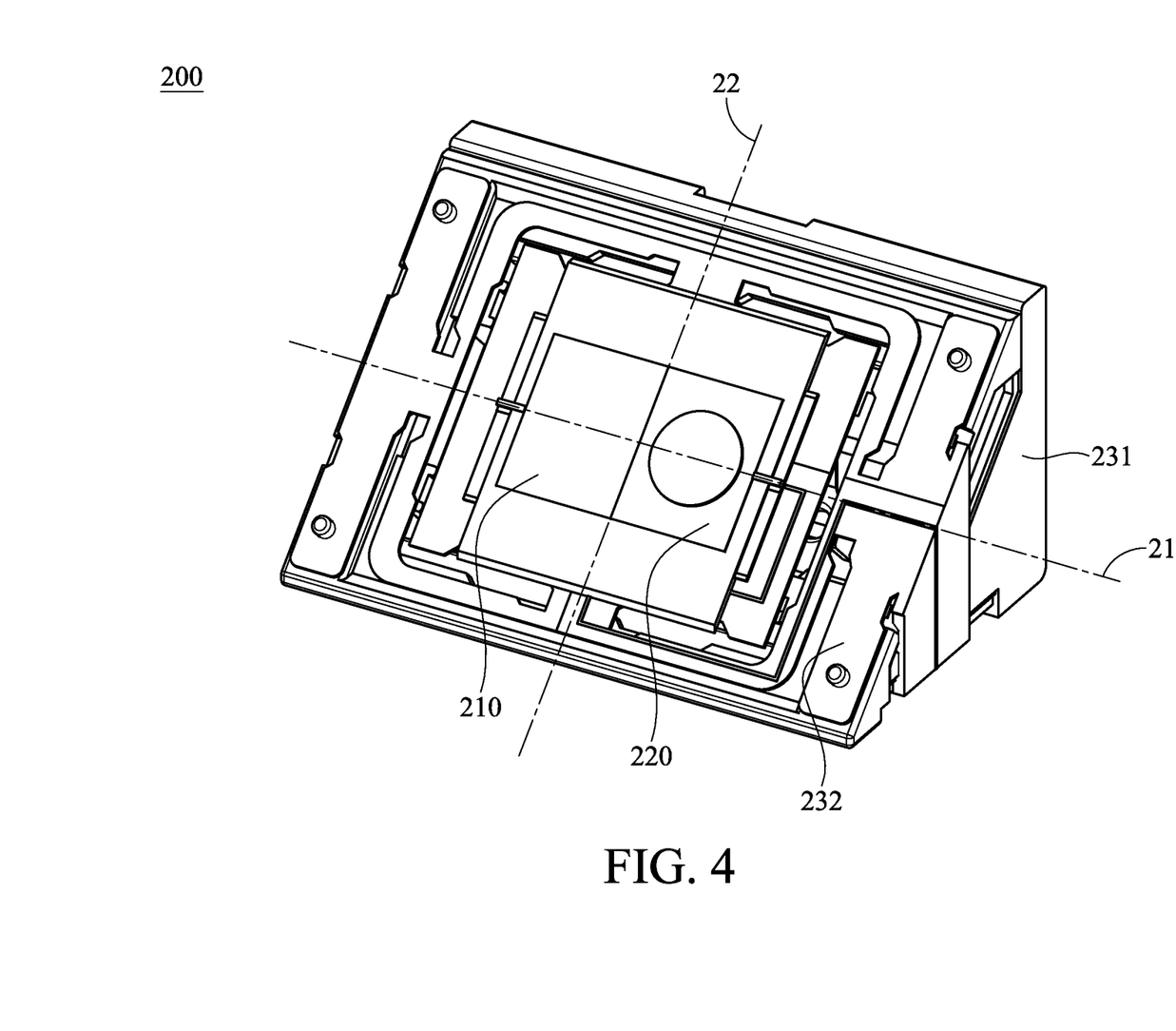
FIG. 4 is a schematic diagram of an optical member driving mechanism according to another embodiment of the invention.
Figure 5:
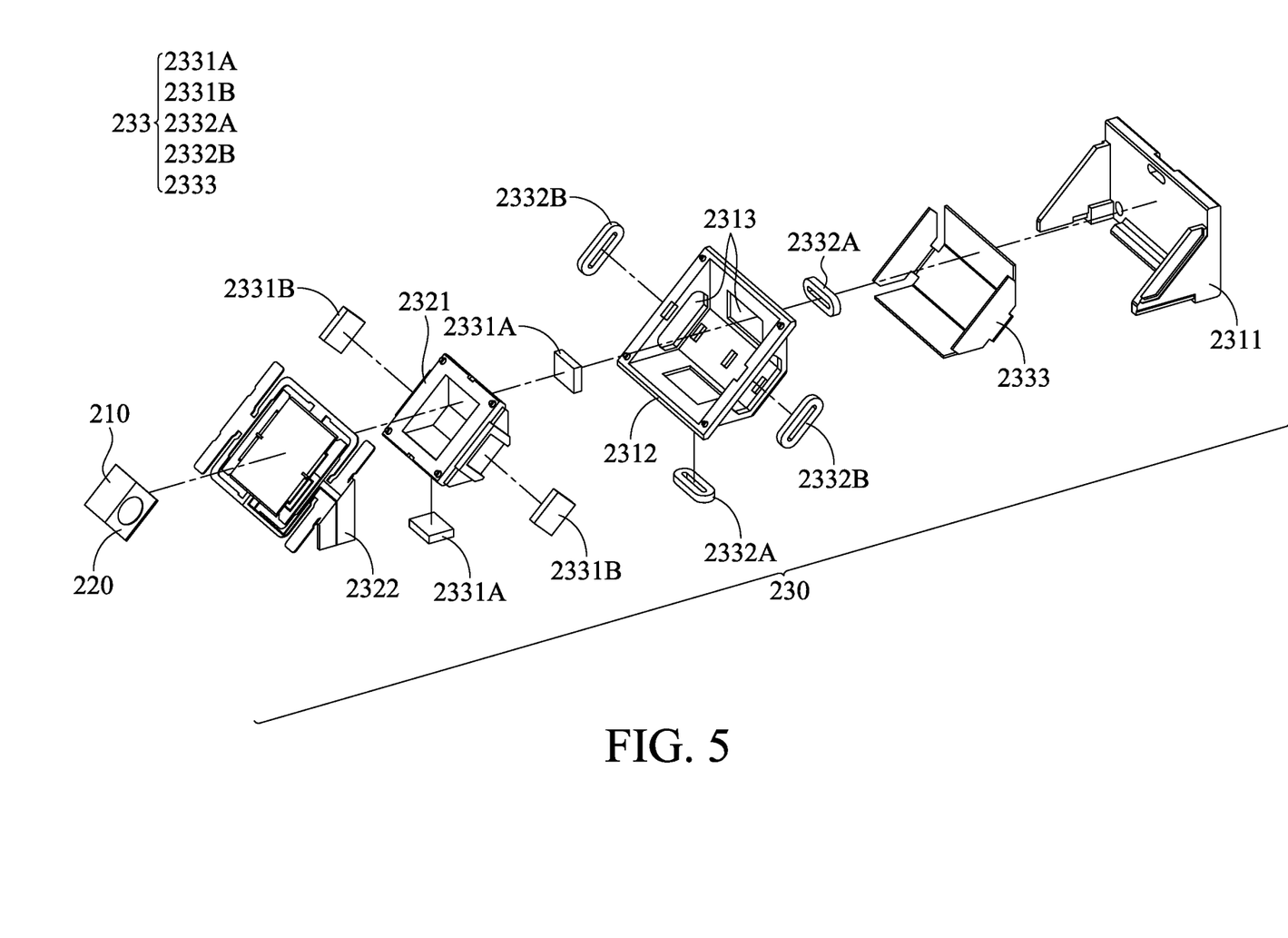
FIG. 5 is a schematic diagram of an optical member driving mechanism according to another embodiment of the invention.

Referring to FIGS. 4 and 5, in another embodiment, an optical member driving mechanism 200 primarily includes a light emitter 210, a light receiver 220, and a rotation module. The light emitter 210 and the light receiver 220 are disposed on the rotation module 230, and the rotation module 230 can drive the light emitter 210 and the light receiver 220 to rotate around a first rotation axis 21 and a second rotation axis 22, wherein the first rotation axis 21 is perpendicular to the second rotation axis 22.

The rotation module 230 includes a fixed portion 231, a movable portion 232, and a driving assembly 233. The fixed portion 231 includes a base 2311 and a frame 2312. The base 2311 is fixedly joined to the frame 2312. The movable portion 232 includes a supporting member 2321 and a carrier 2322. The movable portion 232 is movably connected to the fixed portion 231.

Figure 6:
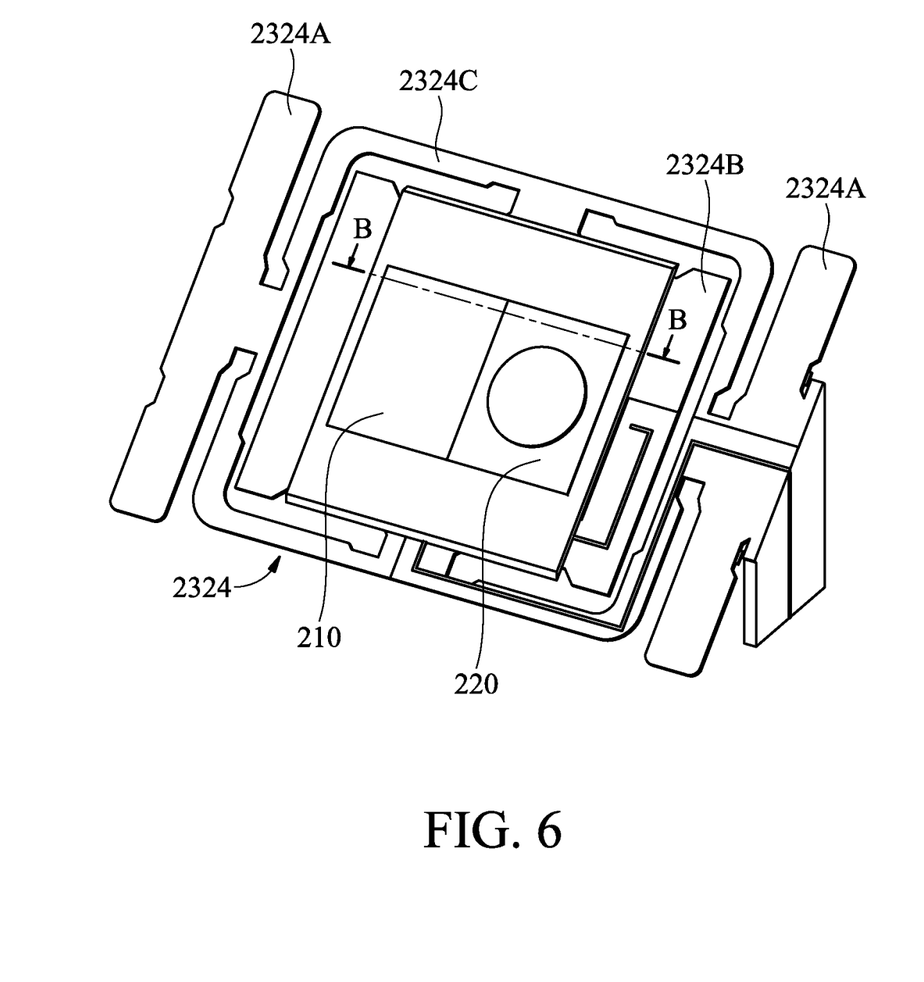
FIG. 6 is a schematic diagram of a light emitter, a light receiver, and a movable portion according to another embodiment of the invention.
Figure 7:
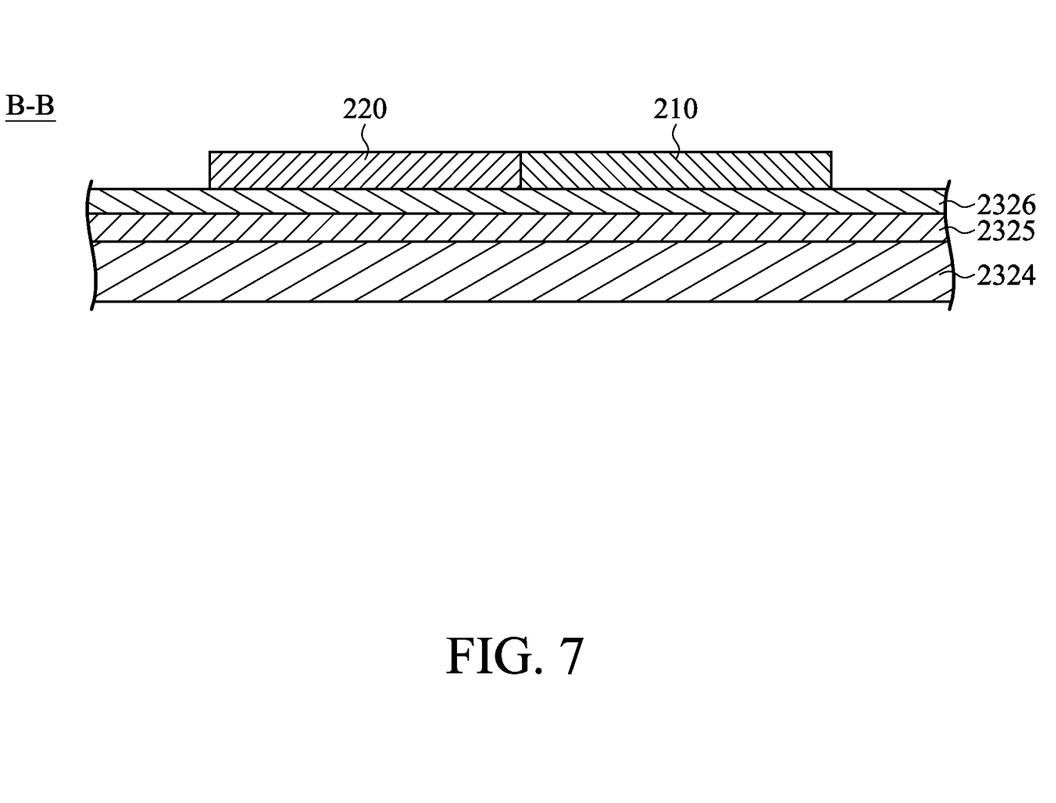
FIG. 7 is a cross-sectional view along the line B-B in FIG. 6.

Referring to FIGS. 5-7, in this embodiment, the carrier 2322 has a metal substrate 2324, an insulation layer 2325, and a wire layer 2326. The insulation layer 2325 is disposed between the metal substrate 2324 and the wire layer 2326. The light emitter 210 and the light receiver 220 are disposed on the insulation layer 2325 and electrically connected to the wire layer 2326.

In this embodiment, the metal substrate 2324 is constituted by a flexible sheet spring, including at least one first engaged section 2324A, at least one second engaged section 2324B, and at least one string section 2324C. The first engaged section 2324A is affixed to the frame 2312, the insulation layer 2325 is disposed on the second engaged section 2324B, and the string section 2324C connects the first engaged section 2324A to the second engaged section 2324B. Therefore, the light emitter 210 and the light receiver 220 can be suspended on the fixed portion 231 by the metal substrate 2324 of the movable portion 232.

The supporting member 2321 is connected to the second engaged section 2324B, and the second engaged section 2324B is disposed between the supporting member 2321 and the insulation layer 2325. The driving assembly 233 includes at least one first electromagnetic driving member 2331A, at least one first electromagnetic driving member 2331B, at least one second electromagnetic driving member 2332A, at least one second electromagnetic driving member 2332B, and a circuit board 2333. The first electromagnetic driving members 2331A and 2331B are affixed to the supporting member 2321, and respectively disposed on the different surfaces of the supporting member 2321. The circuit board 2333 is clamped between the base 2311 and the frame 2312. The second electromagnetic driving members 2332A and 2332B are disposed on the circuit board 2333, and respectively corresponds the first electromagnetic driving members 2331A and 2331B through the openings 2313 of the frame 2312. The second engaged section 2324B can be driven to move relative to the fixed portion 231 by the first electromagnetic driving members 2331A and 2331B and the second electromagnetic driving members 2332A and 2332B.

In detail, in this embodiment, the first electromagnetic members 2331A and 2331B are magnets, and the second electromagnetic members 2332A and 2332B are coils. When a current flows through the second electromagnetic member 2332A, an electromagnetic effect is generated between the first electromagnetic driving member 2331A and the second electromagnetic member 2332A, and the second engaged section 2324B is driven to rotate around the first rotation axis 21 relative to the fixed portion 231. When a current flows through the second electromagnetic member 2332B, an electromagnetic effect is generated between the first electromagnetic driving member 2331B and the second electromagnetic member 2332B, and the second engaged section 2324B is driven to rotate around the second rotation axis 22 relative to the fixed portion 231.

In some embodiments, the first electromagnetic driving members 2331A and 2331B are coils, and the second electromagnetic members 2332A and 2332B are magnets.

Since the light emitter 210 and the light receiver 220 are disposed on the second engaged section 2324B, when the second engaged section 2324B is driven to rotate, the light emitter 210 and the light receiver 220 rotate simultaneously. Therefore, the scanning range of the optical member driving mechanism 200 can be increased, and the situation that the reflected light cannot be received by the light receiver 220 due to the position can be reduced.

The light emitter 210 and the light receiver 220 are arranged along the first rotation axis 21, so that the first rotation axis 21 passes through the light emitter 210 and the light receiver 220. Moreover, the light emitter 210 and the light receiver 220 are respectively disposed on the different sides of the second rotation axis 22, and the distance between the light emitter 210 and the second rotation axis 22 is substantially the same as the distance between the light receiver 220 and the second rotation axis 22.

Figure 8:
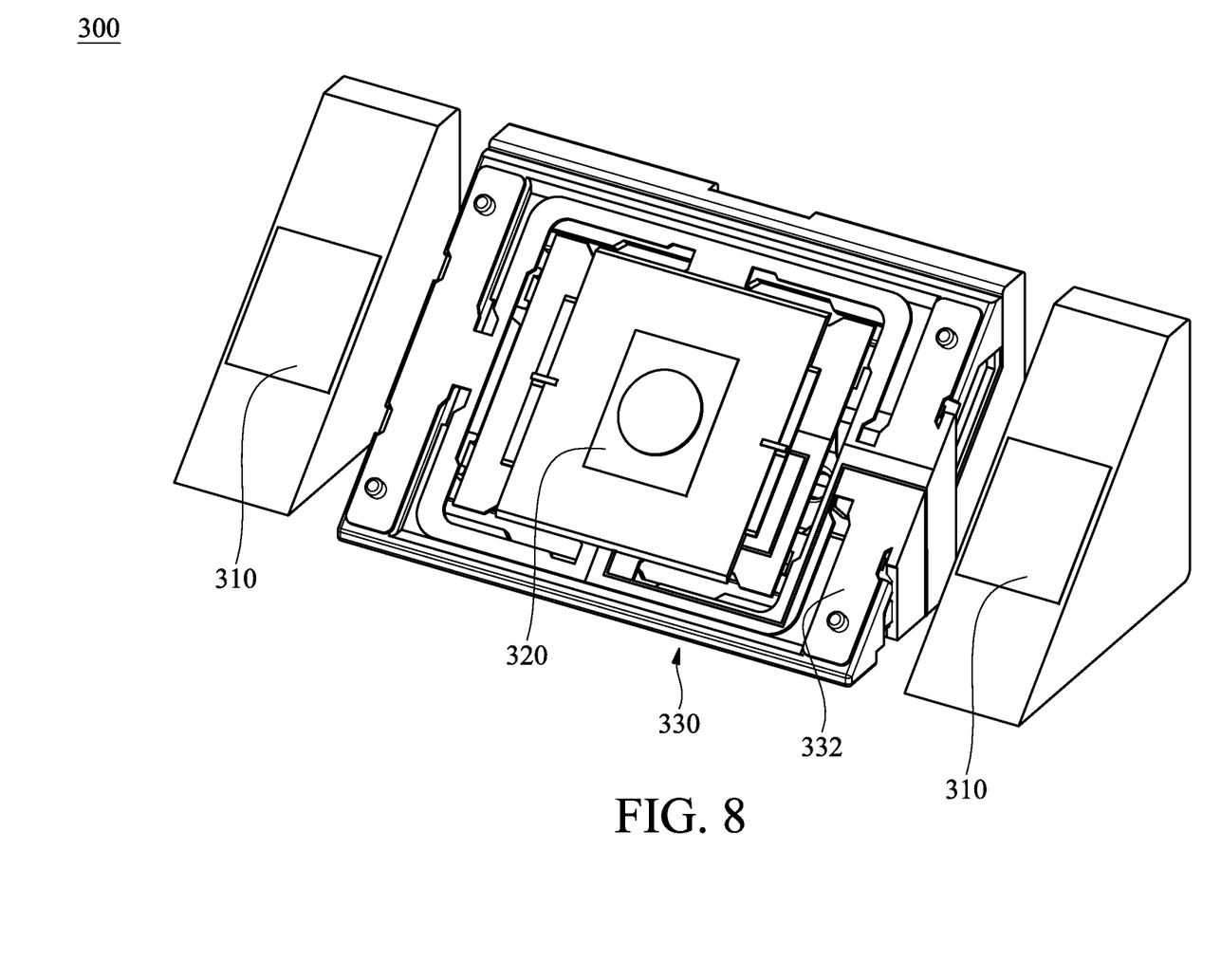
FIG. 8 is a schematic diagram of an optical member driving mechanism according to another embodiment of the invention.

Referring to FIG. 8, in another embodiment, an optical member driving mechanism 300 primarily includes two light emitters 310, a light receiver 320, and a rotation module 330, wherein the structure of the rotation module 330 is the same as that of the rotation module 230, so that the features thereof are not repeated in the interest of brevity. The light receiver 320 is disposed on the movable portion 332 of the rotation module 330, and two light emitters 310 are disposed on opposite sides of the light receiver 320. Owing to the rotation of the light receiver 320, the scanning range of the optical member driving mechanism 300 can be increased. Furthermore, since the light receiver 320 can receive the reflected lights from two light emitters 310, the profile of the object can be accurately calculated.

Figure 9:
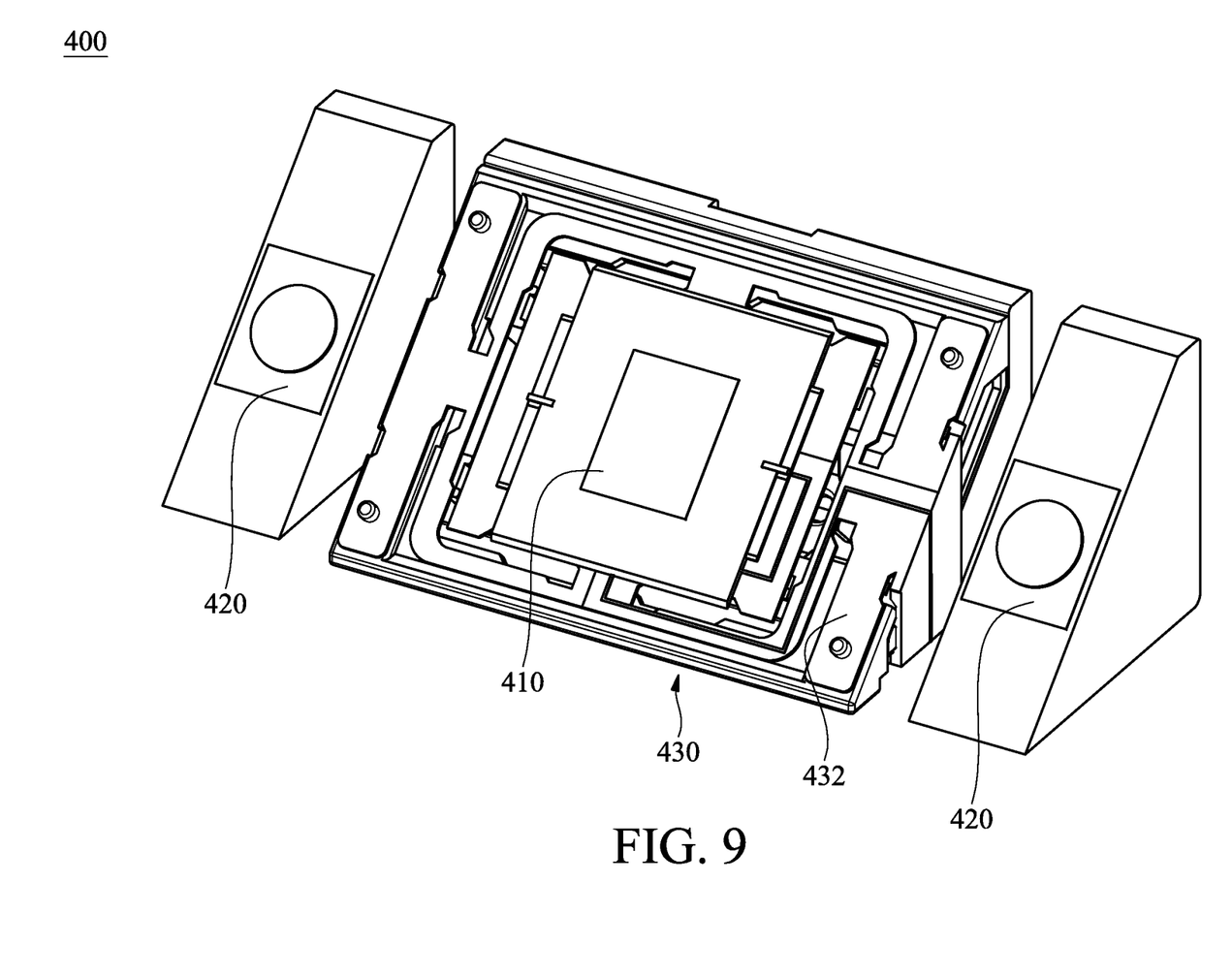
FIG. 9 is a schematic diagram of an optical member driving mechanism according to another embodiment of the invention.

Referring to FIG. 9, in another embodiment, an optical member driving mechanism 400 primarily includes a light emitter 410, two light receivers 420, and a rotation module 430, wherein the structure of the rotation module 430 is the same as that of the rotation module 230, so that the features thereof are not repeated in the interest of brevity. The light emitter 410 is disposed on the movable portion 432 of the rotation module 430, and two light receivers 420 are disposed on opposite sides of the light emitter 410. The light receiving ranges of two light receivers 420 can be overlapped. Owing to the rotation of the light emitter 410, the scanning range of the optical member driving mechanism 400 can be increased.

Figure 10:
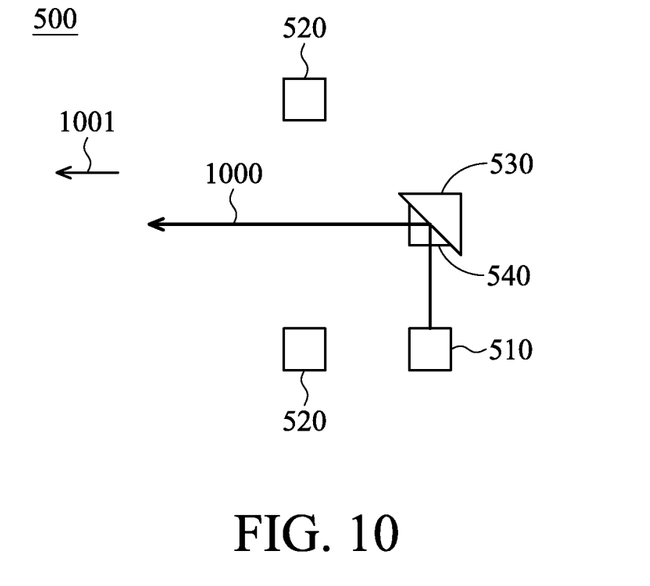
FIG. 10 is a schematic diagram of an optical member driving mechanism according to another embodiment of the invention.

Referring to FIG. 10, in another embodiment, an optical member driving mechanism 500 primarily includes a light emitter 510, two light receivers 520, a rotation module 530, and a reflecting member 540, wherein the structure of the rotation module 530 is the same as that of the rotation module 230, so that the features thereof are not repeated in the interest of brevity.

The reflecting member 540 can be a mirror or a prism, and can be disposed on the rotation module 530. The light emitter 510 emits light 1000 toward the reflecting member 540. After being reflected by the reflecting member 540, the light 1000 moves toward the object in a particular direction 1001. Two light receivers 520 are disposed on opposite sides of the reflecting member 540. After being reflected by the object, the light 1000 can be received by two receivers 520.

It should be noted that, as seen from the direction 1001, the light emitter 510 overlaps one of the light receivers 520, so as to save space. For example, the optical member driving mechanism 500 in this embodiment can be used in the vehicle, so as to save space between two receivers 520 to dispose other components.

Figure 11:
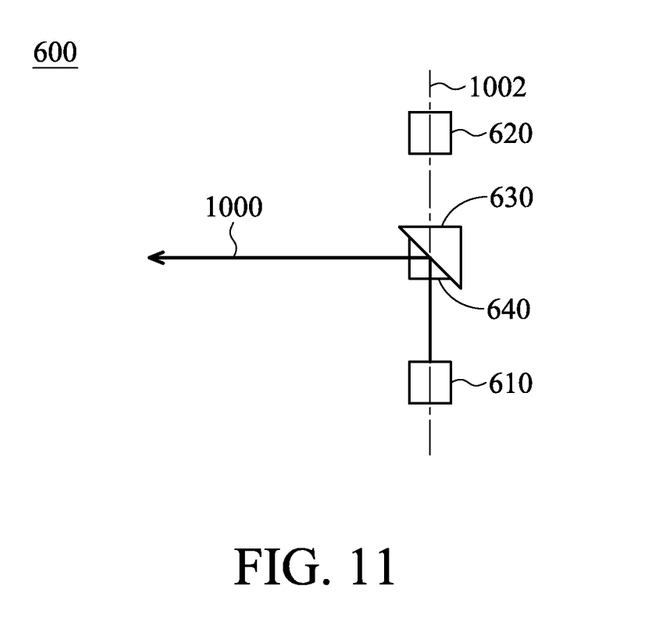
FIG. 11 is a schematic diagram of an optical member driving mechanism according to another embodiment of the invention.

Referring to FIG. 11, in another embodiment, an optical member driving mechanism 600 primarily includes a light emitter 610, a light receiver 620, a rotation module 630, and a reflecting member 640, wherein the structure of the rotation module 630 is the same as that of the rotation module 230, so that the features thereof are not repeated in the interest of brevity.

The reflecting member 640 can be a mirror or a prism, and can be disposed on the rotation module 630. The light emitter 610 emits light 1000 toward the reflecting member 640, and the reflecting member 640 reflects the light 1000 to the object. After being reflected by the object, the light 1000 can be received by the receiver 620.

Specifically, the light emitter 610, the reflecting member 640, and the light receiver 620 are arranged in a straight line 1002, so that the thickness of the optical member driving mechanism 600 can be reduced. The optical member driving mechanism 600 can be used in the portable device.

Figure 12:
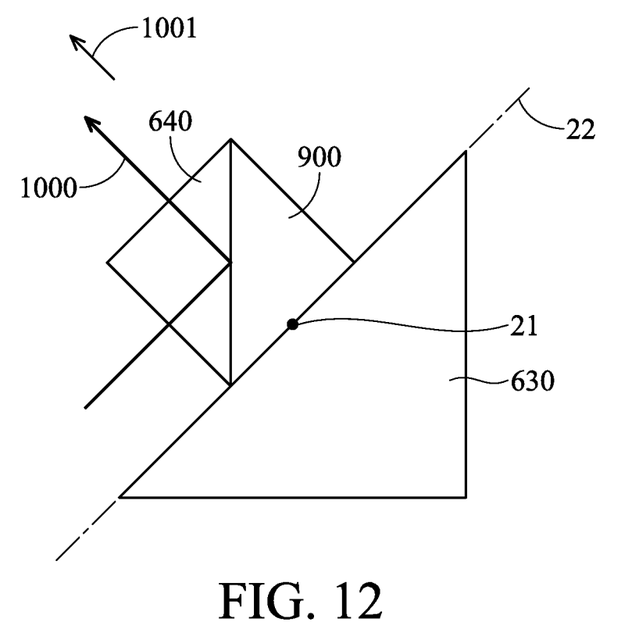
FIG. 12 is a schematic diagram of a rotation module, a reflecting member, and a light path adjusting member according to another embodiment of the invention.

In the aforementioned embodiments, when the light emitter is disposed on the rotation module, or the light is reflected by the reflecting member on the rotation module, the light being emitted toward the object may not shift horizontally due to the rotation. Therefore, as shown in FIG. 12, in some embodiments, a light path adjusting member 900 can be disposed on the rotation module 630 (or the rotation module 230, 330, 430 or 530). The light emitter 210 or 410 or the reflecting member 540 or 640 can be disposed on the light path adjusting member 900.

Owing to the light path adjusting member 900, the emission direction 1001 of the reflected light 1000 can be parallel or perpendicular to the second rotation axis 22. The light being emitting toward the object can shift horizontally.

Figure 13:
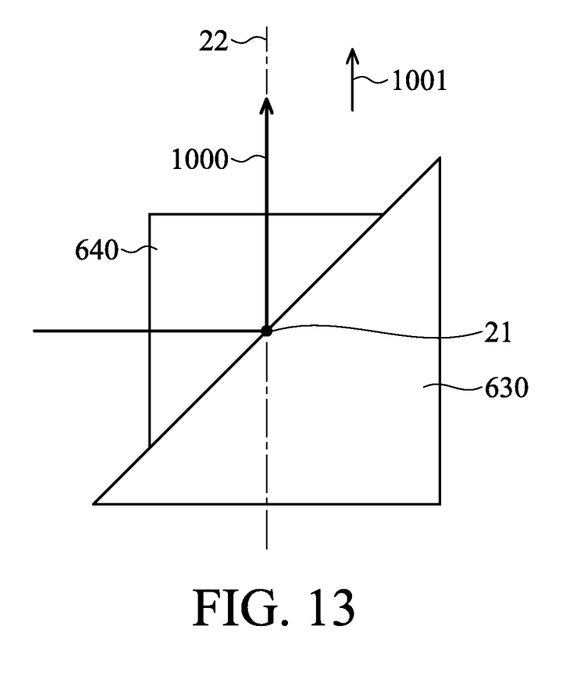
FIG. 13 is a schematic diagram of a rotation module and a reflecting member according to another embodiment of the invention.

As shown in FIG. 13, in some embodiments, the direction of the magnetic pushing force of the driving assembly 233 can be changed to adjust the second rotation axis 22. The second rotation axis 22 can be adjusted to be parallel or perpendicular to the emission direction 1001 of the reflected light 1000, so that the light being emitted toward the object can shift horizontally.

In the aforementioned embodiments, the light emitter and the light receiver can be a fill light member (such as a flash) and an image sensor.

In summary, an optical member driving mechanism is provided, including a movable portion, a fixed portion, a driving assembly, at least one light emitter, and at least one light receiver. The driving assembly is configured to drive the movable portion to move relative to the fixed portion. The light emitter emits light toward an object, and the light receiver receives the light reflected by the object.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical member driving mechanism, comprising:
   a movable portion;
   a fixed portion;
   a driving assembly, configured to drive the movable portion to move relative to the fixed portion;
   at least one light emitter, configured to emit light toward an object, wherein the light moves along a direction between the movable portion and the object and reaches the object; and
   at least one light receiver, wherein the light receiver receives the light reflected by the object,
   wherein the movable portion is rotatable around a first rotation axis relative to the fixed portion, and the first rotation axis is not parallel to the direction.

2. The optical member driving mechanism as claimed in claim 1, wherein the movable portion comprises a carrier, the light emitter or the light receiver is disposed on the carrier, wherein the carrier has a metal substrate, an insulation layer, and a wire layer, the insulation layer is disposed between the metal substrate and the wire layer, and the wire layer is electrically connected to the light emitter or the light receiver.

3. The optical member driving mechanism as claimed in claim 2, wherein the metal substrate is a flexible sheet spring, and the light emitter or the light receiver is suspended on the fixed portion via the metal substrate.

4. The optical member driving mechanism as claimed in claim 2, wherein the metal substrate comprises:
   a first engaged section, affixed to the fixed portion;
   a second engaged section, wherein the insulation layer is disposed on the second engaged section; and
   a string section, connected to the first engaged section and the second engaged section.

5. The optical member driving mechanism as claimed in claim 1, wherein the light emitter and the light receiver are disposed on the movable portion.

6. The optical member driving mechanism as claimed in claim 5, wherein the driving assembly is configured to drive the movable portion to rotate around the first rotation axis relative to the fixed portion, and the first rotation axis passes through the light emitter and the light receiver.

7. The optical member driving mechanism as claimed in claim 5, wherein the driving assembly is configured to drive the movable portion to rotate around a second rotation axis relative to the fixed portion, and the second rotation axis is disposed between the light emitter and the light receiver.

8. The optical member driving mechanism as claimed in claim 7, wherein a distance between the light emitter and the second rotation axis is substantially the same as a distance between the light receiver and the second rotation axis.

9. The optical member driving mechanism as claimed in claim 1, wherein the optical member driving mechanism comprises two light receivers, and the movable portion is disposed between the light receivers.

10. The optical member driving mechanism as claimed in claim 9, wherein the light emitter is disposed on the movable portion.

11. The optical member driving mechanism as claimed in claim 9, wherein the optical member driving mechanism further comprises a reflecting member disposed on the movable portion, and the light from the light emitter is reflected by the reflecting member and is emitted toward the object.

12. The optical member driving mechanism as claimed in claim 11, wherein the light from the light emitter is reflected by the reflecting member and moves in a direction, and the light emitter overlaps one of the light receivers as seen from the direction.

13. The optical member driving mechanism as claimed in claim 1, wherein the optical member driving mechanism comprises two light emitters, the movable portion is disposed between the light emitters, and the light receiver is disposed on the movable portion.

14. The optical member driving mechanism as claimed in claim 1, wherein the optical member driving mechanism further comprises a reflecting member disposed on the movable portion, the light from the light emitter is reflected by the reflecting member and is emitted toward the object, and the light emitter, the reflecting member, and the light receiver are arranged in a straight line in sequence.

15. The optical member driving mechanism as claimed in claim 1, wherein the light receiver is an image sensor.

16. The optical member driving mechanism as claimed in claim 1, wherein the light emitter is disposed on the movable portion, and the light from the light emitter moves toward the object in a direction, wherein the driving assembly is configured to drive the movable portion to rotate around the first rotation axis and a second rotation axis relative to the fixed portion, the first rotation axis is perpendicular to the direction and the second rotation axis, and the second rotation axis is perpendicular or parallel to the direction.

17. The optical member driving mechanism as claimed in claim 1, wherein the optical member driving mechanism further comprises a reflecting member disposed on the movable portion, and the light from the light emitter is reflected by the reflecting member and moves in a direction, wherein the driving assembly is configured to drive the movable portion to rotate around the first rotation axis and a second rotation axis relative to the fixed portion, the first rotation axis is perpendicular to the direction and the second rotation axis, and the second rotation axis is perpendicular or parallel to the direction.

18. The optical member driving mechanism as claimed in claim 1, wherein the optical member driving mechanism further comprises a light path adjusting member disposed on the movable portion, and the light emitter is disposed on the light path adjusting member.

19. The optical member driving mechanism as claimed in claim 1, wherein the optical member driving mechanism further comprises a light path adjusting member and a reflecting member, the light path adjusting member is disposed on the movable portion, and the reflecting member is disposed on the light path adjusting member.

* * * * *